US012585690B2

(12) United States Patent
Fujimoto et al.

(10) Patent No.:  US 12,585,690 B2
(45) Date of Patent:      Mar. 24, 2026

(54) COMPUTER-READABLE RECORDING MEDIUM STORING INFORMATION VERIFICATION PROGRAM, INFORMATION PROCESSING APPARATUS, AND INFORMATION PROCESSING SYSTEM

(71) Applicant: Fujitsu Limited, Kawasaki (JP)

(72) Inventors: Kaori Fujimoto, Kamakura (JP); Junichi Suga, Ota (JP); Toshiyuki Yoshitake, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 18/653,456

(22) Filed: May 2, 2024

(65) Prior Publication Data

US 2024/0394295 A1      Nov. 28, 2024

(30) Foreign Application Priority Data

May 24, 2023    (JP) ................................. 2023-085214

(51) Int. Cl.
*G06F 16/30*        (2019.01)
*G06F 16/383*       (2019.01)
*G06F 16/387*       (2019.01)
(52) U.S. Cl.
CPC .......... *G06F 16/387* (2019.01); *G06F 16/383* (2019.01)
(58) Field of Classification Search
CPC .............................. G06F 16/383; G06F 16/387
See application file for complete search history.

(56) References Cited

U.S. PATENT DOCUMENTS

| | | | |
|---|---|---|---|
| 2013/0132151 A1* | 5/2013 | Stibel | ..................... G06Q 10/00 |
| | | | 705/7.28 |
| 2014/0344172 A1 | 11/2014 | Ansari | |
| 2016/0328482 A1* | 11/2016 | Shah | ................... G06F 16/9535 |
| 2019/0163794 A1* | 5/2019 | Smith | ................... H04L 67/535 |

(Continued)

FOREIGN PATENT DOCUMENTS

| | | |
|---|---|---|
| JP | 2022-122297 A | 8/2022 |
| WO | 2019/244849 A1 | 12/2019 |

OTHER PUBLICATIONS

Article entitled "Assessing the Reliability of Relevant Tweets and Validation Using Manual and Automatic Approaches for Flood Risk Communication", by Liu et al., dated Sep. 5, 2020 (Year: 2020).*

(Continued)

*Primary Examiner* — Mahesh H Dwivedi
(74) *Attorney, Agent, or Firm* — WHDA, LLP

(57)                ABSTRACT

A computer-readable recording medium stores an information verification program for causing a computer to execute a process. The process includes: acquiring posted information that includes first information which is text information, second information which is at least one of image information and audio information, and metadata of the second information; specifying an event that occurs, based on the first information; specifying an influence range that indicates a range of at least one of a geographical influence and a temporal influence by the event; and calculating a first reliability level of the posted information based on the influence range and the metadata.

5 Claims, 16 Drawing Sheets

(56) References Cited

U.S. PATENT DOCUMENTS

| | | | |
|---|---|---|---|
| 2021/0271814 A1 | 9/2021 | Andou et al. | |
| 2023/0091292 A1* | 3/2023 | Shughrue | G06F 16/215 |
| | | | 707/692 |

OTHER PUBLICATIONS

Article entitled "Incidents1M: A Large-Scale Dataset of Images with Natural Disasters, Damage, and Incidents", by Weber et al., dated Jan. 11, 2022 (Year: 2022).*
Article entitled "A Twitter Data Credibility Framework—Hurricane Harvey as a Use Case", by Yang et al., dated Feb. 28, 2019 (Year: 2019).*

* cited by examiner

FIG. 1

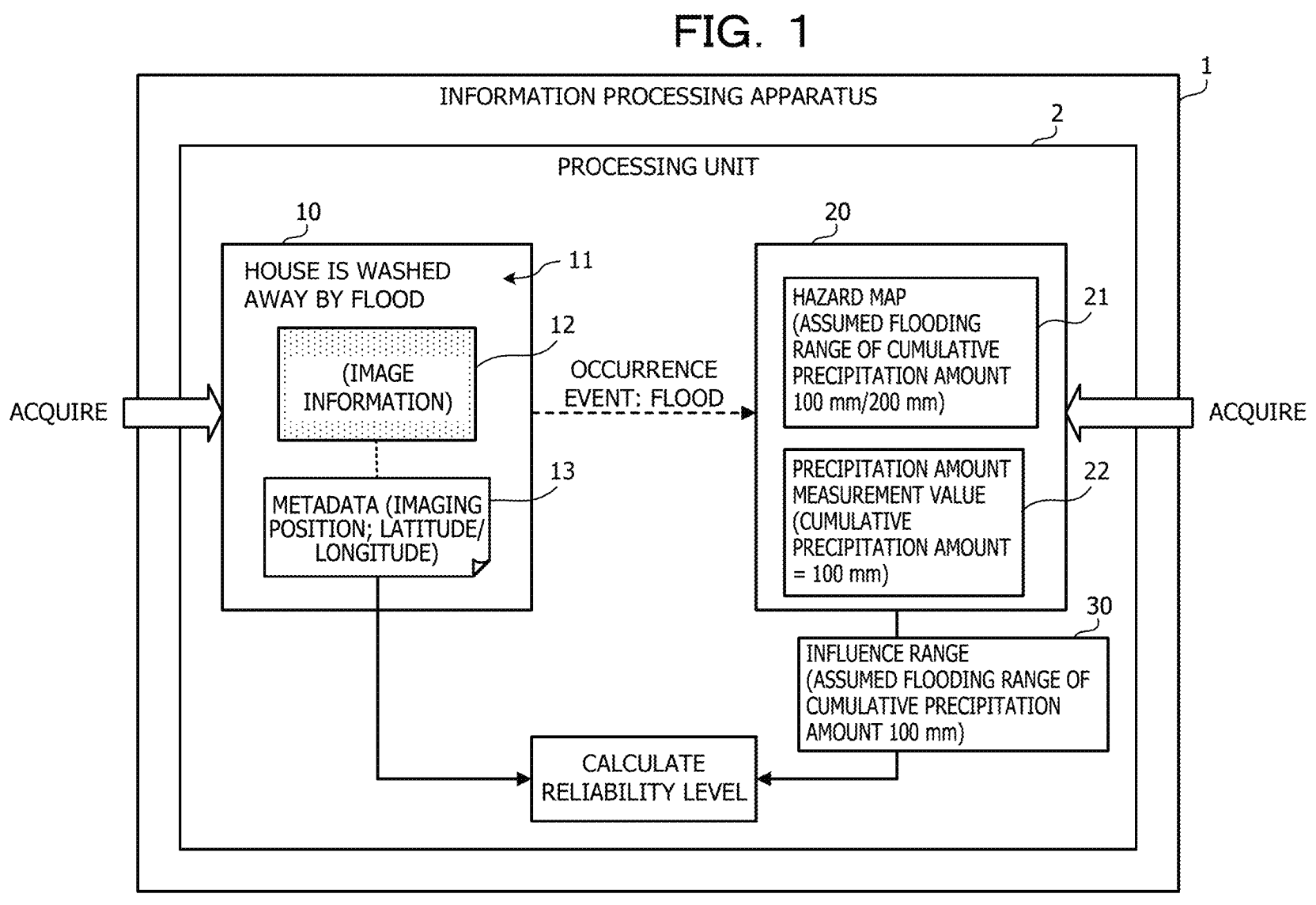

ACQUIRE

ACQUIRE

INFORMATION PROCESSING APPARATUS 1

PROCESSING UNIT 2

20

HAZARD MAP
(ASSUMED FLOODING
RANGE OF CUMULATIVE
PRECIPITATION AMOUNT
100 mm/200 mm) 21

PRECIPITATION AMOUNT
MEASUREMENT VALUE
(CUMULATIVE
PRECIPITATION AMOUNT
= 100 mm) 22

INFLUENCE RANGE
(ASSUMED FLOODING RANGE OF
CUMULATIVE PRECIPITATION
AMOUNT 100 mm) 30

OCCURRENCE
EVENT: FLOOD

HOUSE IS WASHED
AWAY BY FLOOD 11

(IMAGE
INFORMATION) 12

METADATA (IMAGING
POSITION; LATITUDE/
LONGITUDE) 13

10

CALCULATE
RELIABILITY LEVEL

| OCCURRENCE EVENT ID | OCCURRENCE EVENT NAME | OCCURRENCE EVENT CLASSIFICATION NAME | OCCURRENCE TIME/ END TIME |
|---|---|---|---|
| 0001 | TYPHOON 1 | TYPHOON | 2022.07.25 02:00/ - |
| ... | ... | ... | ... |

112

| CAUSE EVENT CLASSIFICATION NAME | RESULT EVENT CLASSIFICATION NAME | INFLUENCE FACTOR | INFLUENCE RANGE REFERENCE INFORMATION |
|---|---|---|---|
| TYPHOON | FLOOD | PRECIPITATION AMOUNT | FLOOD HAZARD MAP |
| | LANDSLIDE | PRECIPITATION AMOUNT | LANDSLIDE DISASTER HAZARD MAP |
| | FLOODING | PRECIPITATION AMOUNT | TERRAIN CLASSIFICATION HAZARD MAP |
| ... | ... | ... | ... |

COMPUTER-READABLE RECORDING MEDIUM STORING INFORMATION VERIFICATION PROGRAM, INFORMATION PROCESSING APPARATUS, AND INFORMATION PROCESSING SYSTEM

CROSS-REFERENCE TO RELATED APPLICATION

This application is based upon and claims the benefit of priority of the prior Japanese Patent Application No. 2023-85214, filed on May 24, 2023, the entire contents of which are incorporated herein by reference.

FIELD

The embodiments discussed herein are related to a non-transitory computer-readable recording medium storing an information verification program, an information processing apparatus, and an information processing system.

BACKGROUND

In recent years, a posting service for displaying posted information posted by a general user on a posting screen has been widely used. For example, there is a service in which posted information including not only text information but also image information and audio information may be posted in a social networking service (SNS, also referred to as social media).

Such posted information may be a powerful information source related to a disaster status in each location in an emergency such as when a disaster occurs. On the other hand, false information may be included in the posted information. Therefore, it is desired to verify a reliability or an accuracy of the posted information and detect the false information in real time.

As an example of this technique, the following posting evaluation method is proposed. In this posting evaluation method, first information on the presence or absence of a predetermined phenomenon is extracted from text information included in posted information, second information on the presence or absence of the phenomenon is extracted from high-reliability information, and an accuracy index of the posted information is calculated by comparing the first information with the second information.

For a use of posted information, for example, a data analysis platform has been proposed in which additional information on a court is searched from a social network.

Japanese Laid-open Patent Publication No. 2022-122297 and U.S. Patent Application Publication No. 2014/344172 are disclosed as related art.

SUMMARY

According to an aspect of the embodiments, a computer-readable recording medium storing an information verification program for causing a computer to execute a process includes: acquiring posted information that includes first information which is text information, second information which is at least one of image information and audio information, and metadata of the second information; specifying an event that occurs, based on the first information; specifying an influence range that indicates a range of at least one of a geographical influence and a temporal influence by the event; and calculating a first reliability level of the posted information based on the influence range and the metadata.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a configuration example and a processing example of a first information processing system;

FIG. 7 is a diagram illustrating a data configuration example of an occurrence event table;

DESCRIPTION OF EMBODIMENTS

Figure 2:
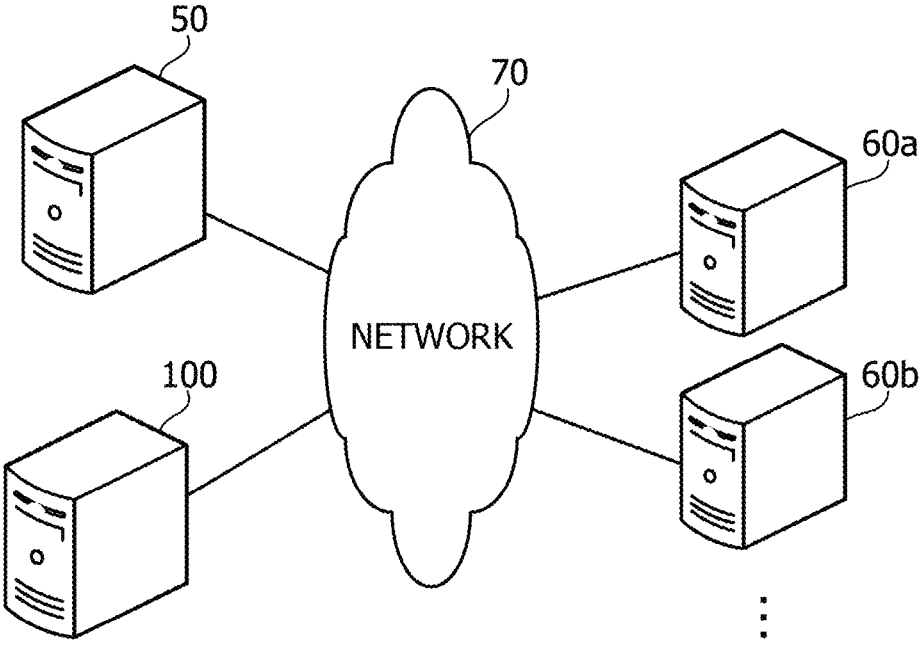
FIG. 2 is a diagram illustrating a configuration example of an information processing system according to a second embodiment.

In the method of verifying the reliability of the posted information by comparing the posted information with the high-reliability information, for example, regarding an event that occurs at a specific location, such as a delay in a train or congestion in a toilet, the reliability of the posted information indicating the event may be verified with relatively high accuracy. For an event that affects a wide range geographically or temporally, such as a disaster, even in a case where posted information is correct, in many cases, an occurrence location or an occurrence time of the event indicated by the posted information does not coincide with an occurrence location or an occurrence time obtained from high-reliability information. Therefore, there is a problem that the reliability of the posted information indicating such an event may not be verified with high accuracy.

According to one aspect, it is an object of the present disclosure to provide an information verification program, an information processing apparatus, and an information processing system capable of calculating a reliability level of posted information with high accuracy.

Hereinafter, embodiments of the present disclosure will be described with reference to the drawings.

First Embodiment

FIG. 1 is a diagram illustrating a configuration example and a processing example of a first information processing system. An information processing apparatus 1 illustrated in FIG. 1 is an apparatus that verifies a reliability of information posted to a posting service such as an SNS. The information processing apparatus 1 has a processing unit 2. The processing unit 2 is, for example, a processor. In this case, a process of the information processing apparatus 1 to be described below is implemented by, for example, a processor executing a predetermined program.

The processing unit 2 acquires posted information including first information that is text information, second information that is at least one of image information and audio information, and metadata of the second information, as a verification target. In the example illustrated in FIG. 1, it is assumed that posted information 10 including a posted text 11 "a house is washed away by the flood" as the first information and including image information 12 as the second information is acquired. Metadata 13 included in the posted information 10 includes information on an imaging position of the image information 12. For example, the information on the imaging position is represented by a latitude and a longitude.

After acquiring such posted information 10, the processing unit 2 specifies an occurring event (occurrence event) based on the posted text 11. For example, the processing unit 2 extracts a word from the posted text 11 and collates the extracted word with words indicating a plurality of events determined in advance to specify an occurrence event from the posted text 11. For example, in the example illustrated in FIG. 1, a flood is specified as an occurrence event from a word "flood" included in the posted text 11. For example, the specifying of the occurrence event may be performed by collating information on an actually occurring event, which is acquired from a high-reliability information source such as a public institution, with the information on the event that is extracted from the posted text 11.

Next, the processing unit 2 specifies a range of an influence (influence range) by the specified occurrence event. As the influence range, at least one range of a geographical influence and a temporal influence by the occurrence event is indicated. In the example illustrated in FIG. 1, since the metadata 13 includes an imaging position that is geographical information, a geographical influence range by the occurrence event, for example, a range in which the flood occurs is specified.

As an example here, the processing unit 2 acquires influence range information 20 corresponding to the occurrence event (flood) from a high-reliability information source such as a public institution, and specifies an influence range 30 based on the influence range information 20. As the influence range information 20, a hazard map 21 indicating an assumed flooding range and a precipitation amount measurement value 22 are acquired. As an example, the hazard map 21 illustrates each of assumed flooding ranges in a case where cumulative precipitation amounts in a certain time period T are 100 mm and 200 mm. As an example of the precipitation amount measurement value 22, a measurement value of a cumulative precipitation amount in the latest certain time period T is acquired. In the example illustrated in FIG. 1, it is assumed that the cumulative precipitation amount of the precipitation amount measurement value 22 indicates 100 mm. In this case, the processing unit 2 specifies an assumed flooding range in the case of the cumulative precipitation amount 100 mm indicated by the hazard map 21, as the influence range 30.

Next, based on the specified influence range 30 and the metadata 13 of the image information 12, the processing unit 2 calculates a reliability level of the posted information 10. For example, the processing unit 2 calculates the reliability level of the posted information 10 based on a positional relationship between the assumed flooding range specified as the influence range 30 and the imaging position of the image information 12 indicated by the metadata 13. As a specific example, as a distance between the assumed flooding range and the imaging position is shorter, a calculated value of the reliability level is higher.

As a comparative example, a method of calculating a reliability level by a coincidence determination between an imaging position indicated by metadata 13 and high-reliability information indicating a location at which flooding occurs will be described. In this case, for example, the high-reliability information indicates whether or not a flood occurs at a plurality of predetermined points. The imaging position indicated by the metadata 13 may not coincide with any of such a plurality of points. Therefore, for example, even in a case where the posted information 10 is correct information (for example, a flood occurs at the imaging position), when the imaging position does not coincide with a location at which the flood occurs among the plurality of points described above, a calculated value of a reliability level of the posted information 10 is low.

By contrast, in the process described above by the processing unit 2, the reliability level of the posted information 10 is calculated based on the influence range (the assumed flooding range in FIG. 1) by the occurrence event and the metadata (the imaging position of the image information 12 in FIG. 1) of the second information (the image information 12 in FIG. 1). Accordingly, the reliability level is calculated by comparing the metadata with the geographical or temporal range affected by the event, instead of a discrete location or time at which the event occurred. Therefore, even in a case where an event that may affect a wide range geographically or temporally such as a disaster such as a flood is specified from the posted text 11, it is possible to calculate the reliability level of the posted information 10 with high accuracy.

As the temporal influence range, for example, an occurrence period of the occurrence event (a period from an occurrence start time to an occurrence end time) may be applied. In this case, a creation time of the second information (the imaging time in the case of the image information) is used as the metadata, and the processing unit 2 may accurately calculate the reliability level based on the occurrence period and the creation time.

Both of the geographical influence range and the temporal influence range may be used as the influence range. In this case, for example, the processing unit 2 may accurately calculate the reliability level based on a comparison result between geographical information included in the metadata and the geographical influence range, and a comparison result between temporal information included in the metadata and the temporal influence range.

Second Embodiment

FIG. 2 is a diagram illustrating a configuration example of an information processing system according to a second embodiment. The information processing system illustrated in FIG. 2 includes an SNS server 50, information source servers 60a, 60b, and . . . , and a verification server 100. The SNS server 50, the information source servers 60a, 60b, and . . . , and the verification server 100 are coupled to each other via a network 70. The network 70 is, for example, a wide area communication network such as the Internet.

The SNS server 50 is a server computer operated by an operator of an SNS. The SNS server 50 displays posted information posted by a user over a posting screen. As an example in the present embodiment, it is assumed that posted information including a posted text and an image is posted to the SNS server 50 and is displayed over the posting screen. The image included in the posted information may be either a still image or a moving image.

The information source servers 60a, 60b, and . . . are server computers serving as information sources for the verification server 100 to collect information on various events. For example, the information source servers 60a, 60b, and . . . are Web servers that operate Web sites that provide information on the events. The information source servers 60a, 60b, and . . . are operated by a public institution such as a country or a local government or a private business that provides weather information or the like, for example. Accordingly, the verification server 100 may acquire high-reliability information on the event from the information source servers 60a, 60b, and . . . .

The verification server 100 monitors posted information posted to the SNS server 50, verifies a reliability of the posted information, and outputs a verification result. For example, the verification server 100 extracts event information on an event such as weather, an earthquake, or a disaster from the posted information which is posted, and collects relevant information on the extracted event information from the information source servers 60a, 60b, and . . . . By comparing the extracted event information with the collected relevant information, the verification server 100 evaluates a reliability of the posted information and calculates a reliability level that is an index indicating the reliability.

Figure 3:
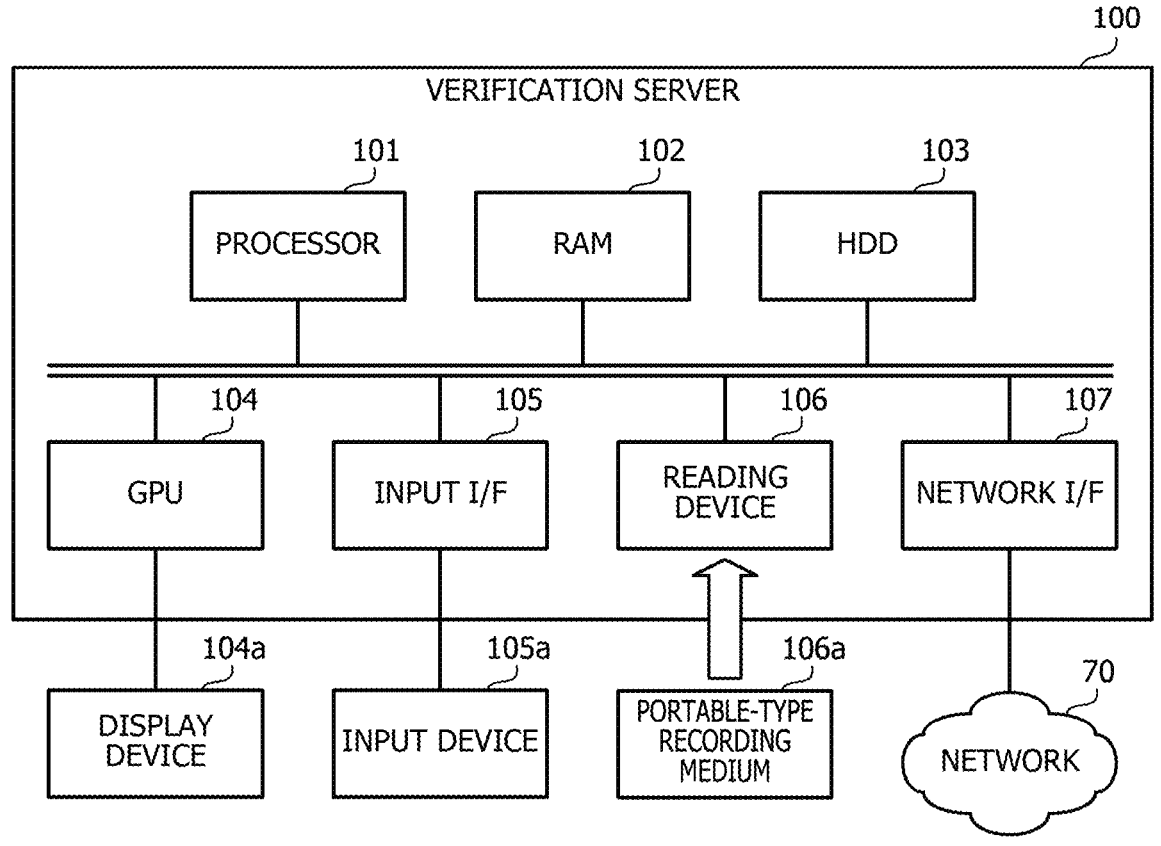
FIG. 3 is a diagram illustrating a hardware configuration example of a verification server.

FIG. 3 is a diagram illustrating a hardware configuration example of a verification server. For example, the verification server 100 is implemented as a computer having a hardware configuration as illustrated in FIG. 3.

The verification server 100 illustrated in FIG. 3 includes a processor 101, a random-access memory (RAM) 102, a hard disk drive (HDD) 103, a graphics processing unit (GPU) 104, an input interface (I/F) 105, a reading device 106, and a network interface (I/F) 107.

The processor 101 comprehensively controls the entire verification server 100. The processor 101 is, for example, a central processing unit (CPU), a microprocessor unit (MPU), a digital signal processor (DSP), an application-specific integrated circuit (ASIC), or a programmable logic device (PLD). The processor 101 may also be a combination of two or more elements among the CPU, the MPU, the DSP, the ASIC, and the PLD.

The RAM 102 is used as a main storage device of the verification server 100. The RAM 102 temporarily stores at least a part of an operating system (OS) program and an application program to be executed by the processor 101. The RAM 102 also stores various kinds of data to be used in processes performed by the processor 101.

The HDD 103 is used as an auxiliary storage device of the verification server 100. The OS program, the application program, and various kinds of data are stored in the HDD 103. A different type of non-volatile storage device such as a solid-state drive (SSD) may be used as the auxiliary storage device.

A display device 104a is coupled to the GPU 104. The GPU 104 causes the display device 104a to display an image in accordance with an instruction from the processor 101. Examples of the display device 104a include a liquid crystal display, an organic electroluminescence (EL) display, and the like.

An input device 105a is coupled to the input interface 105. The input interface 105 transmits a signal output from the input device 105a to the processor 101. The input device 105a includes a keyboard, a pointing device, and the like. The pointing device includes a mouse, a touch panel, a tablet, a touch pad, a track ball, and the like.

A portable-type recording medium 106a is removably attached to the reading device 106. The reading device 106 reads data recorded in the portable-type recording medium 106a, and transmits the data to the processor 101. The portable-type recording medium 106a includes an optical disc, a semiconductor memory, and the like.

The network interface 107 transmits and receives data to and from another apparatus such as the SNS server 50 via the network 70.

A processing function of the verification server 100 may be implemented by the hardware configuration as described above. The SNS server 50 and the information source servers 60a, 60b, and . . . may be implemented as a computer having the hardware configuration as illustrated in FIG. 3.

By the way, for a high-urgency event such as a disaster, provision of accurate information in real time is desired for safety of people. At present, for example, when a disaster occurs, a disaster status of each region is transmitted from a news organization as much as possible, but it may not be said that the disaster status of each fine region is transmitted in real time. On the other hand, a general user transmits an event that occurs in each location over an SNS in real time. Therefore, posted information of the SNS may be a powerful information source in an emergency due to a disaster or the like.

False information or incorrect information is often spread in the SNS. Therefore, when the false information or the incorrect information is spread at a time of occurrence of a high-urgency event such as a disaster, there is a possibility that the spread of the false information or the incorrect information may adversely affect an action or psychology of people and cause confusion. For example, for posted information including images and sound, a viewer may visually and aurally understand the information, and thus the user is more likely to attract attention than a post including only text. Therefore, in a case where an image or sound including the false information or the incorrect information is spread, the influence of the image or sound is strong. Accordingly, it is important for a user who views posted information to recognize whether the posted information including not only text but also an image or a sound is correct information, or false information or incorrect information.

Figure 4:
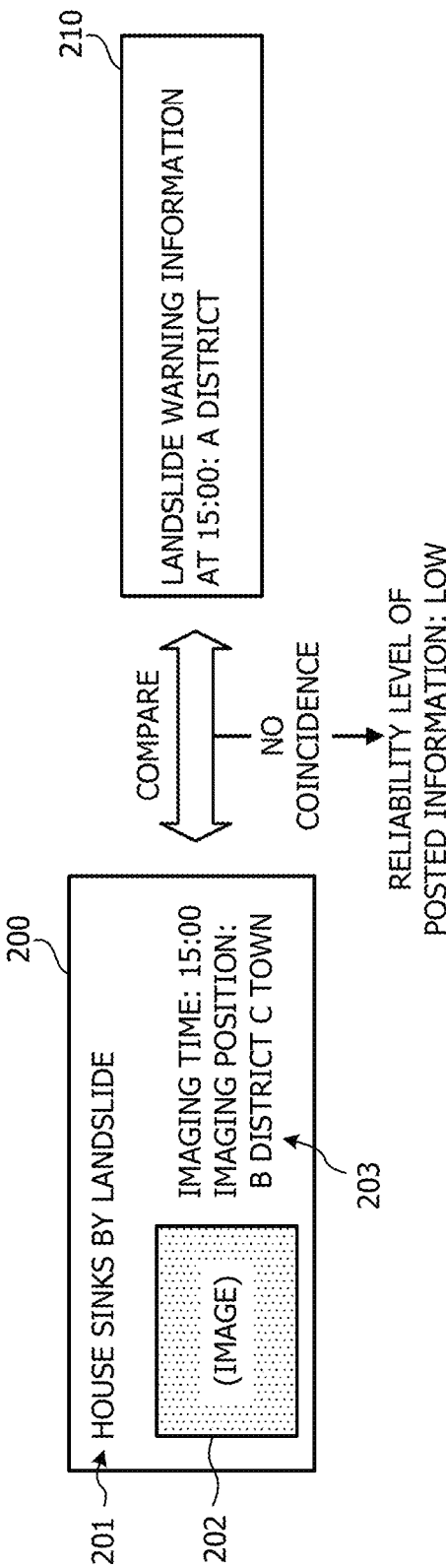
FIG. 4 is a diagram illustrating a comparative example of reliability level calculation of posted information.

FIG. 4 is a diagram illustrating a comparative example of reliability level calculation of posted information. As an example of a method for calculating a reliability level of posted information, a method is conceivable in which the reliability level of the posted information is calculated by a coincidence determination between metadata (for example, an imaging position) of an image included in the posted information and high-reliability information on event information extracted from the posted information.

In the example illustrated in FIG. 4, it is assumed that posted information 200 including a captured image 202 and metadata 203 related to the image 202 is acquired. It is assumed that a posted text 201 is a text "a house sinks by landslide", and the image 202 includes a scene as indicated by the posted text 201. For example, the metadata 203 includes an imaging time "15:00" and an imaging position "B district C town" of the image 202.

For verification of the posted information 200, it is assumed that high-reliability information 210 is acquired from a high-reliability information source. The high-reliability information 210 illustrated in FIG. 4 is landslide warning information transmitted by a country. In the example illustrated in FIG. 4, the high-reliability information 210 indicates that the landslide warning information at 15:00 is issued to A district.

It is assumed that a reliability level of the posted information 200 is calculated by a coincidence determination between the posted information 200 and the high-reliability information 210 in this manner. In this case, the imaging time included in the metadata 203 coincides with the predicted landslide warning time (15:00) indicated by the high-reliability information 210, and the imaging position "B district C town" included in the metadata 203 is different from the landslide warning target district "A district" indicated by the high-reliability information 210. Therefore, even in a case where a content of the posted information 200 is correct, the reliability level of the posted information 200 may be calculated as a low value.

For example, an event such as a train delay or toilet congestion occurs at a specific location. Therefore, for such an event, a reliability level may be calculated with relatively high accuracy by a coincidence determination between high-reliability information indicating an occurrence location of the event and the metadata 203.

On the other hand, an influence of a disaster is likely to extend over a relatively wide range. From the high-reliability information 210, information indicating whether or not a disaster occurs at each of a plurality of predetermined points is obtained. It is difficult to determine whether or not a disaster occurs at a location at a distance equal to or greater than a certain distance from any of the plurality of points, only from the high-reliability information 210 as illustrated in FIG. 4. Therefore, calculation accuracy of the reliability level is decreased.

By contrast, the verification server 100 according to the present embodiment collects information capable of specifying a range (influence range) influenced by occurrence of an event such as a disaster from a Web site of a public institution, a Web site of a service company that provides information on the event, and the like. The verification server 100 specifies the influence range by the event occurrence from the collected information, and calculates a reliability level of posted information 200, based on the specified influence range and metadata 203.

As the influence range, at least one of a geographical influence range and a temporal influence range is used. In a case where the geographical influence range is used, the reliability level is calculated based on an imaging position which is geographical information in the metadata 203 and an influence range. In a case where the temporal influence range is used, the reliability level is calculated based on an imaging time which is temporal information in the metadata 203 and an influence range.

In the following description, it is assumed that a geographical influence range is used as an example. Posted text and an image are included in posted information as a verification target. In a case where the posted information includes a sound instead of the image, a sound collection position and a sound collection time included in metadata of the sound may be used, instead of an imaging position and an imaging time included in metadata of the image, respectively.

Figure 5:
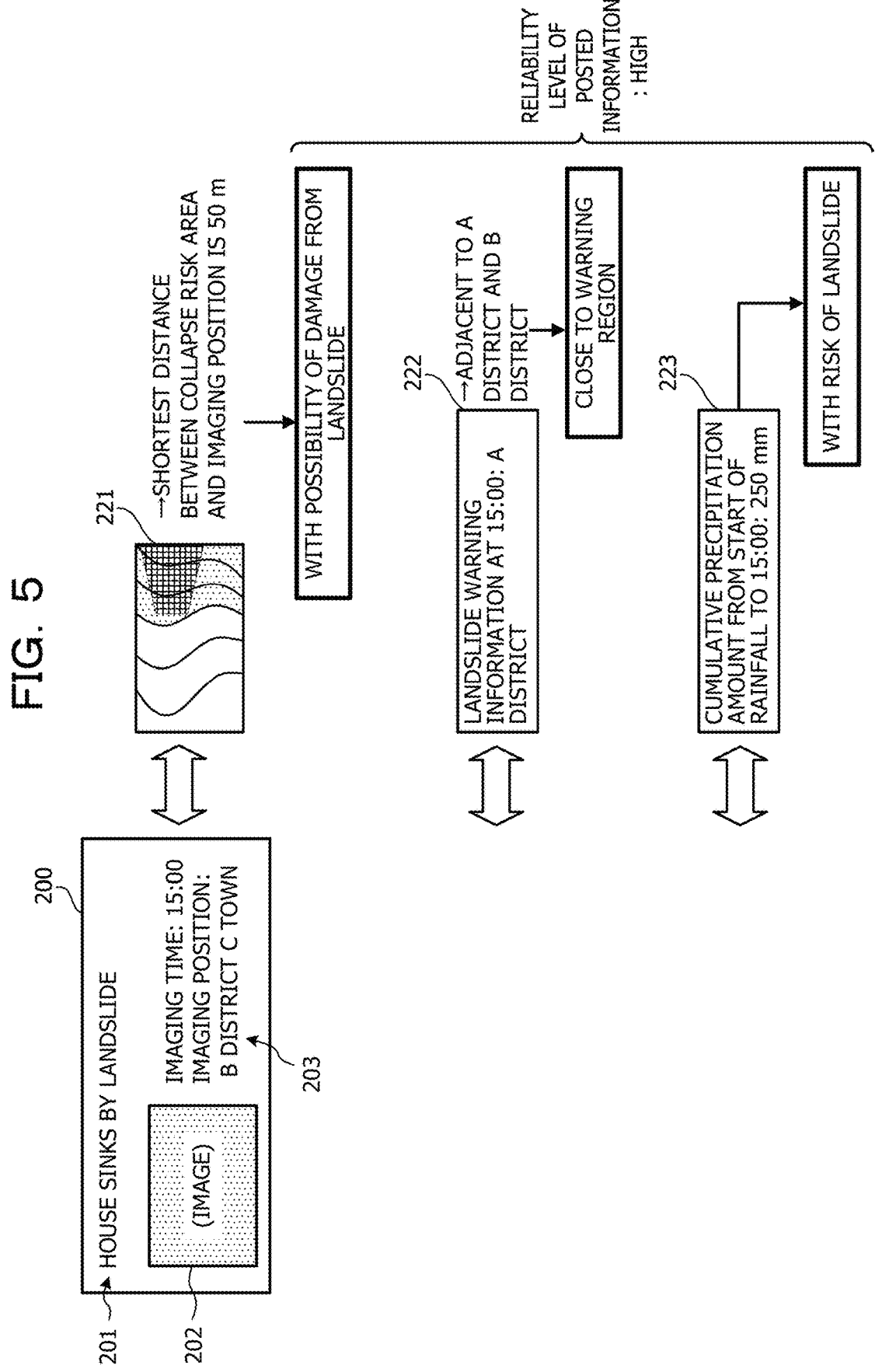
FIG. 5 is a diagram illustrating an example of reliability level calculation according to the second embodiment.

FIG. 5 is a diagram illustrating an example of reliability level calculation according to the second embodiment. In FIG. 5, the posted information 200 illustrated in FIG. 4 is set as a target of reliability level calculation.

As illustrated in FIG. 5, as the influence range information 221 for specifying an influence range by landslide, a hazard map illustrating a collapse risk area terrain by landslide is used. For example, the verification server 100 specifies the collapse risk area indicated by the hazard map as the influence range, and calculates a reliability level based on the shortest distance between the collapse risk area and the imaging position of the image 202 included in the metadata 203. As the shortest distance is shorter, the calculated value of the reliability level is higher. In the example of FIG. 5, since the shortest distance between the collapse risk area and the imaging position is 50 m, which is relatively short, it is determined that there is a possibility that the imaging position is damaged by landslide. Therefore, a relatively high value is calculated as the reliability level of the posted information 200. In this manner, the reliability level may be calculated with high accuracy by using the influence range due to the event.

As the influence range information for specifying the influence range, for example, simulation information of disaster occurrence, risk information of the disaster occurrence, information indicating a past disaster occurrence range, or the like may be used. These pieces of influence range information are acquired from a high-reliability information source such as a Web site of a public institution or a Web site of a service company that provides information on the event.

As illustrated in FIG. 5, the verification server 100 may further calculate the reliability level by combining various types of high-reliability information, in addition to the influence range. For example, high-reliability information 222 illustrated in FIG. 5 is landslide warning information transmitted by a country, and indicates that landslide may occur in A district. For example, the verification server 100 may calculate the reliability level based on a positional relationship (distance or the like) between the A district indicated in the high-reliability information 222 and the imaging position included in the metadata 203. In the example illustrated in FIG. 5, it is determined that the A district and the B district that is the imaging position are adjacent to each other, and the imaging position is close to the landslide warning region. Therefore, a relatively high value is calculated as the reliability level of the posted information 200.

The warning region "A district" indicated by the high-reliability information 222 may be considered as an influence range of the disaster occurrence. For example, the verification server 100 may also acquire the high-reliability information 222 as the influence range information.

The high-reliability information 223 illustrated in FIG. 5 is a measurement value of a cumulative precipitation amount transmitted by a country, and indicates that the cumulative precipitation amount from a start of rainfall to 15:00 is measured as 250 mm. For example, since the cumulative precipitation amount up to an imaging time included in the metadata 203 is large (for example, exceeds a predetermined threshold value), the verification server 100 determines that there is a risk of landslide at the imaging position, and calculates a relatively high value as the reliability level of the posted information 200.

By integrating (for example, averaging) the three types of reliability levels calculated as described above, the verification server 100 may calculate a final reliability level for the posted information 200.

Figure 6:
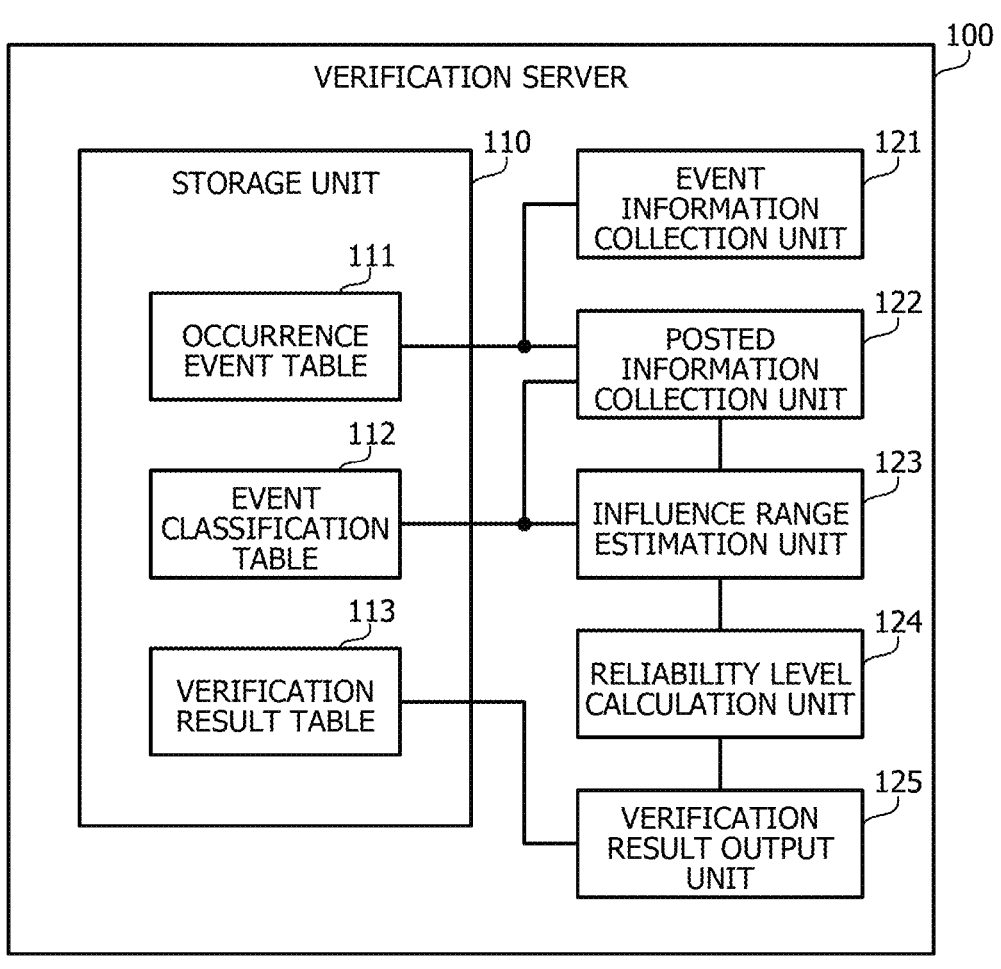
FIG. 6 is a diagram illustrating a configuration example of a processing function included in the verification server.

FIG. 6 is a diagram illustrating a configuration example of a processing function included in a verification server. The verification server 100 includes a storage unit 110, an event information collection unit 121, a posted information collection unit 122, an influence range estimation unit 123, a reliability level calculation unit 124, and a verification result output unit 125. The storage unit 110 is a storage region secured in a storage device such as the RAM 102 or the HDD 103 included in the verification server 100. An occurrence event table 111, an event classification table 112, and a verification result table 113 are stored in the storage unit 110.

Information on an occurring event (occurrence event) is registered in the occurrence event table 111. The information registered in the occurrence event table 111 is information collected from an information source determined in advance and having a high reliability, such as the information source servers 60a, 60b, and . . . .

Information indicating a relationship between a cause event and a result event is registered in the event classification table 112. The cause event is an event that may cause the result event, and the result event is an event that may be caused by occurrence of the cause event. In the event classification table 112, information indicating a type of measurement value for estimating an influence range of the result event and information indicating a reference destination of information referred to for estimating the influence range are also registered.

Information indicating a result of verifying posted information is registered in the verification result table 113. For example, an identification number for identifying posted information and a reliability level of the posted information are registered in the verification result table 113 in association with each other.

The processes of the event information collection unit 121, the posted information collection unit 122, the influence range estimation unit 123, the reliability level calculation unit 124, and the verification result output unit 125 are implemented by, for example, the processor 101 executing a predetermined program.

The event information collection unit 121 collects information on an occurrence event from an information source determined in advance and having a high reliability, such as the information source servers 60a, 60b, and . . . , and registers the information as occurrence event information in the occurrence event table 111.

The posted information collection unit 122 acquires posted information posted to the SNS server 50 from the SNS server 50.

The influence range estimation unit 123 analyzes a posted text included in the posted information to extract information on an event, and specifies an occurrence event related to the event based on the occurrence event table 111. The influence range estimation unit 123 collects influence range information or high-reliability information corresponding to the specified occurrence event, and estimates an influence range of the occurrence event based on the collected information and metadata of the posted information.

Based on the metadata of the image in the posted information and the estimated influence range, the reliability level calculation unit 124 calculates a first reliability level. The reliability level calculation unit 124 calculates a second reliability level, based on a distance between an imaging position of the image and a posting position of the posted information itself. The reliability level calculation unit 124 calculates a third reliability level, based on a difference between an imaging time of the image and a posting time of the posted information itself. The reliability level calculation unit 124 calculates a total reliability level by integrating the first to third reliability levels.

The verification result output unit 125 outputs the calculated total reliability level. For example, the verification result output unit 125 creates a reliability display screen in which the first to third reliability levels are also described together with the total reliability level, and displays the reliability display screen on a terminal of a user. The reliability display screen may be displayed over a posting screen by the SNS server 50, together with the posted information as a verification target.

FIG. 7 is a diagram illustrating a data configuration example of an occurrence event table. Information on an occurrence event collected by the event information collection unit 121 is accumulated in the occurrence event table 111. An occurrence event ID, an occurrence event name, an occurrence event classification name, and an occurrence and end time are registered in the occurrence event table 111 as information on the occurrence event.

The occurrence event ID is identification information for identifying an occurrence event. The occurrence event name indicates a name of the occurrence event. As the occurrence event name, for example, a name named to the occurrence event by a public institution is registered. As the occurrence event classification name, a classification name to which the occurrence event corresponds among result event classification names for classifying a result event is registered. The occurrence and end time indicates an occurrence time and an end time of the occurrence event. Although 2:00 on Jul. 25, 2022 is registered as the occurrence time in FIG. 7, the end time is not registered. This indicates that the occurrence event is not ended yet.

Figure 8:
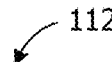
FIG. 8 is a diagram illustrating a data configuration example of an event classification table.

FIG. 8 is a diagram illustrating a data configuration example of an event classification table. Information indicating a corresponding relationship between a cause event classification name for classifying a cause event and a result event classification name for classifying a result event is registered in the event classification table 112. For example, in FIG. 8, result event classification names of "flood", "landslide", and "flooding" is associated with a cause event classification name of "typhoon". This indicates that a cause event of typhoon may cause a result event of flood, landslide, and flooding.

As another cause event, for example, an earthquake, a large-scale accident, and the like are conceivable. As a result event corresponding to an earthquake, a tsunami, landslide, and the like are conceivable. As a result event corresponding to a large-scale accident, a power outage, arrival of a harmful object, and the like are conceivable.

An influence factor and influence range reference information are further registered in the event classification table 112, in association with a combination of the cause event classification name and the result event classification name. The influence factor and the influence range reference information are information (influence range information) for estimating an influence range. The influence factor indicates a type of measurement value referred to for estimating an influence range of the result event. The influence range reference information is reference information that is referred to for estimating the influence range. For example, the influence range by the result event is specified from the measurement value indicated by the influence factor and the influence range reference information. Link information indicating a reference destination (acquisition source) of the influence range reference information determined in advance is also actually registered in an item of the influence range information.

Next, a process of each unit of the verification server 100 will be described.

Figure 9:
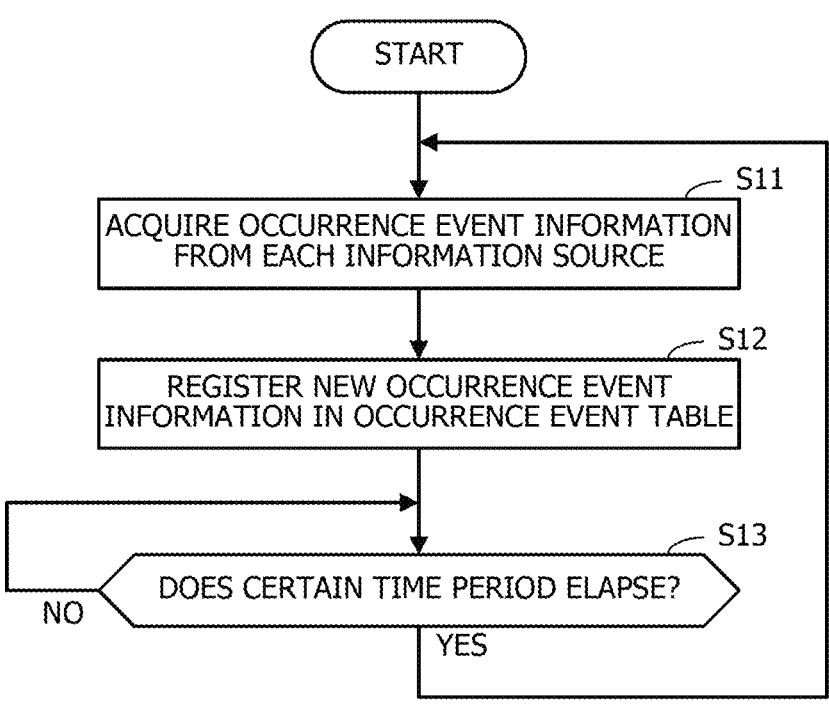
FIG. 9 is a flowchart illustrating an example of an occurrence event information collection process.

FIG. 9 is a flowchart illustrating an example of an occurrence event information collection process.

[STEP S11] The event information collection unit 121 scans a predetermined information source and acquires, from the information source, occurrence event information indicating a new occurrence event and update information of the occurrence event information of the occurrence event. For example, information on events occurring throughout Japan may be acquired in this step S11.

[STEP S12] The event information collection unit 121 registers the occurrence event information indicating the new occurrence event in the occurrence event table 111. When the event information collection unit 121 receives the update information (for example, an end time of the occurrence event) of the occurrence event information of the occurring event, the event information collection unit 121 reflects the update information on the corresponding occurrence event information in the occurrence event table 111.

[STEP S13] It is determined whether or not a certain time period elapses since the execution of the process of step S11. In a case where the certain time period does not elapse, the process waits until the certain time period elapses. After the certain time period elapses, the process returns to step S111, and the process of acquiring occurrence event information is executed.

Figure 10:
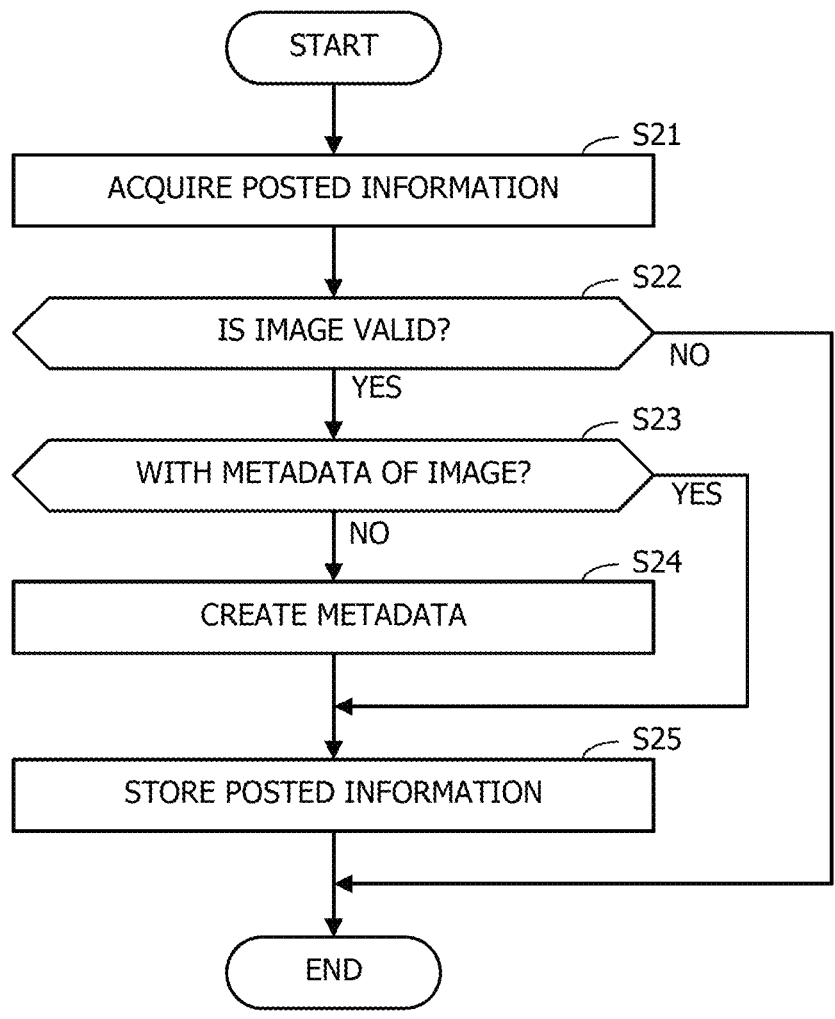
FIG. 10 is a flowchart illustrating an example of a posted information acquisition process.

FIG. 10 is a flowchart illustrating an example of a posted information acquisition process.

[STEP S21] The posted information collection unit 122 acquires posted information posted to the SNS server 50 from the SNS server 50.

[STEP S22] The posted information collection unit 122 verifies validity of an image included in the acquired posted information. In a case where it is determined that the image is valid by the verification, the process proceeds to step S23, and in a case where it is determined that the image is not valid, the process is ended. For example, in the latter case, the verification result output unit 125 outputs 0 points as a total reliability level. Information indicating that the image is invalid may be displayed together with the posted information.

For example, in the verification process in step S22, the posted information collection unit 122 verifies whether the image included in the posted information is not artificially created or processed such as an animation or an illustration, but is a photograph or a moving image obtained by imaging the real world. For example, a discriminator that discriminates between an image artificially created or processed and a photograph obtained by imaging the real world is created in advance by machine learning using the image and the photograph. At step S22, the posted information collection unit 122 inputs the image in the posted information to the created discriminator to verify whether or not the image is a photograph obtained by imaging the real world.

In a case where metadata is added to the image in the posted information, the posted information collection unit 122 verifies whether or not an imaging position or an imaging time of the image included in the metadata is valid information. For example, this verification may be performed by using an image creator certification function included in commercially available image editing software. Alternatively, the following method may be adopted. A first hash value calculated based on a parameter embedded in a predetermined region of an image, a second hash value calculated based on a script for generating a hash value, and the script are recorded in metadata. At step S22, the posted information collection unit 122 calculates a third hash value based on the script in the metadata, and calculates a fourth hash value based on the script in the metadata. By comparing the first and second hash values in the metadata with the calculated third and fourth hash values, the posted information collection unit 122 determines whether the image is tampered with.

[STEP S23] The posted information collection unit 122 determines whether or not an imaging position and an imaging time are added to the image in the posted information as the metadata. In a case where the corresponding metadata is added, the process proceeds to step S25, and in a case where the corresponding metadata is not added, the process proceeds to step S24.

[STEP S24] For example, the posted information collection unit 122 analyzes the image in the posted information to create information that is not added as the metadata, among the imaging position and the imaging time of the image. As an example, the posted information collection unit 122 collates the image in the posted information with an image captured in advance from the sky, such as a satellite image or an aerial image, to estimate the imaging position of the image in the posted information, and adds the imaging position to the image as the metadata. The posted information collection unit 122 estimates the imaging time of the image based on the imaging position included in the metadata or the sunlight incidence or the shadow incidence at the imaging position estimated by the procedure described above, and adds the estimated imaging time to the image as the metadata. The posted information collection unit 122 may perform morphological analysis on a posted text, extract a proper noun, an expression representing a position, and an expression representing a time, and set the former as the imaging position and the latter as the imaging time.

[STEP S25] The posted information collection unit 122 causes the storage unit 110 to temporarily store the acquired posted information.

Figure 11:
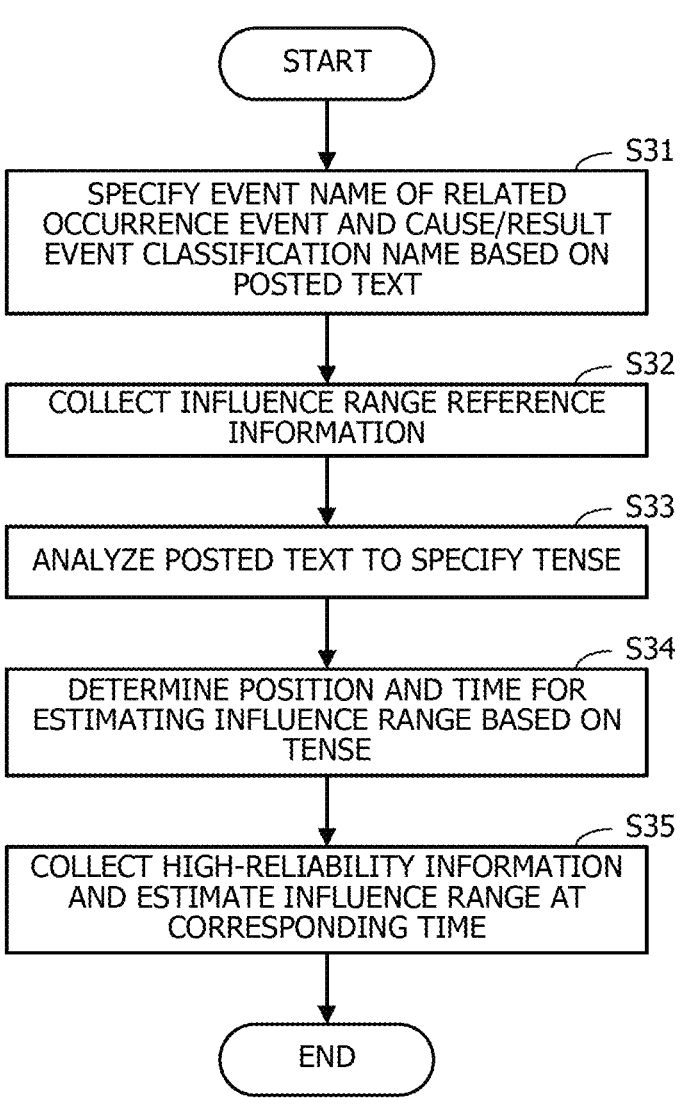
FIG. 11 is a flowchart illustrating an example of an influence range estimation process.
Figure 12:
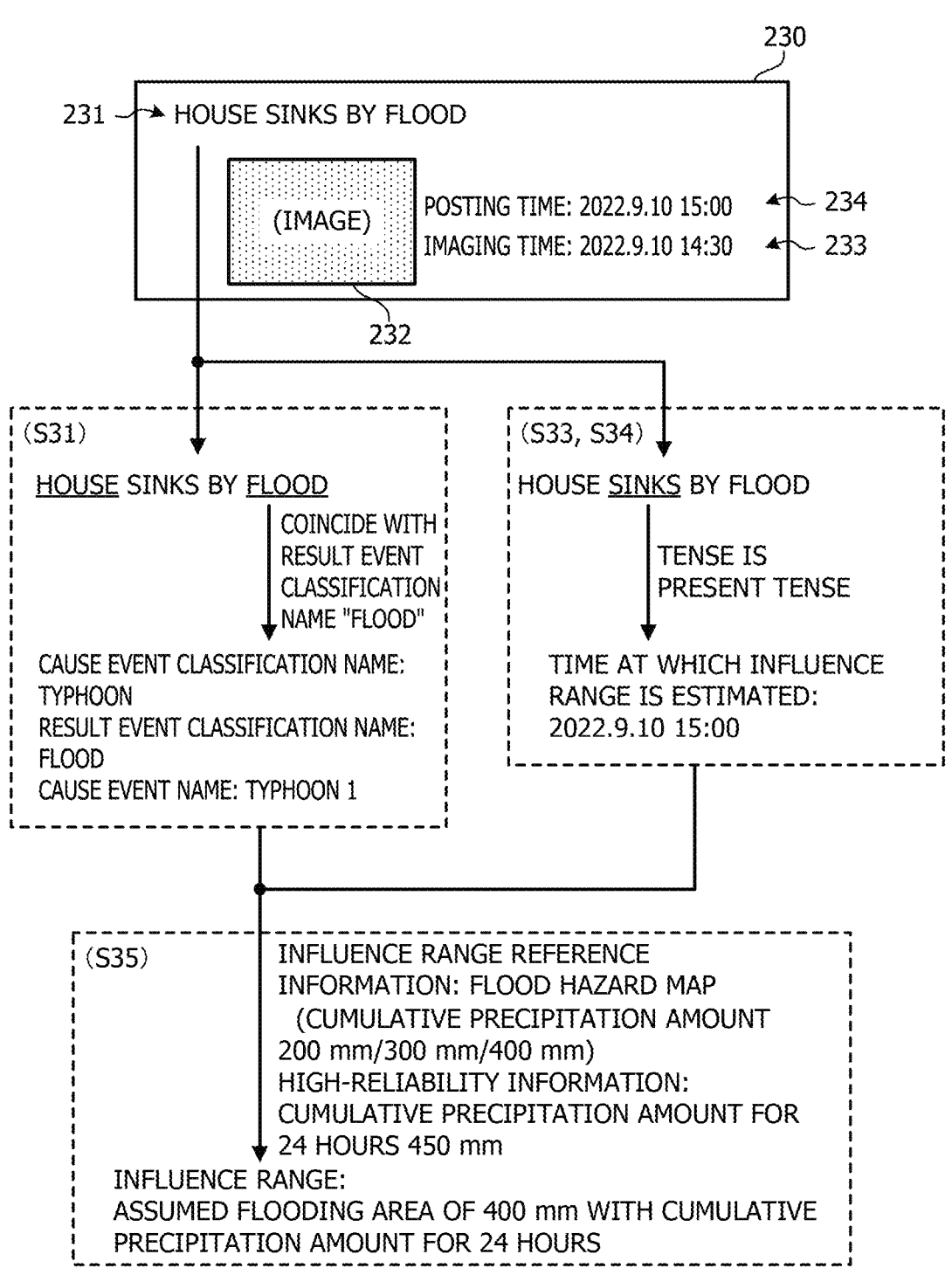
FIG. 12 is a diagram illustrating a specific estimation processing example of an influence range.

FIG. 11 is a flowchart illustrating an example of an influence range estimation process. FIG. 12 is a diagram illustrating a specific estimation processing example of an influence range.

[STEP S31] By analyzing a posted text included in posted information, the influence range estimation unit 123 specifies a cause event classification name, a result event classification name, and an occurrence event name related to the posted information.

For example, the influence range estimation unit 123 extracts a noun from the posted text by performing morphological analysis on the posted text. In a case where the extracted noun coincides with an occurrence event name registered in the occurrence event table 111, the influence range estimation unit 123 specifies the occurrence event name as the occurrence event name related to the posted information. In this case, the influence range estimation unit 123 extracts an occurrence event classification name associated with the specified occurrence event name from the occurrence event table 111, and specifies the extracted occurrence event classification name as the cause event classification name related to the posted information. The influence range estimation unit 123 extracts result event classification names associated with the specified cause event classification name from the event classification table 112, and determines whether any of the extracted result event classification names coincides with the word extracted from the posted text. In a case where any of the extracted result event classification names coincides with the word extracted from the posted text, the influence range estimation unit 123 specifies the result event classification name as the result event classification name related to posted information. In a case where none of the extracted result event classification names coincides with the word extracted from the posted text, the influence range estimation unit 123 searches the posted text for a noun having a meaning close to a meaning of the extracted result event classification name, and specifies a result event classification name corresponding to the case where the search is successful as the result event classification name corresponding to the posted information. For example, the closeness of the meanings of the nouns may be determined by a method such as word2vec, which is a distributed expression of a word.

By contrast, in a case where the noun extracted from the posted text is not registered as an occurrence event name in the occurrence event table 111, the following process is executed. Among the nouns extracted from the posted text, the influence range estimation unit 123 determines whether there is a noun that coincides with a cause event classification name or a result event classification name registered in the event classification table 112. In a case where there is a noun that coincides with the result event classification name among the extracted nouns, the influence range estimation unit 123 specifies the result event classification name as the result event classification name related to the posted information. At the same time, the influence range estimation unit 123 specifies a cause event classification name associated with the result event classification name in the event classification table 112 as the cause event classification name related to the posted information. By contrast, in a case where there is a noun that coincides with the cause event classification name among the nouns extracted from the posted text, the influence range estimation unit 123 specifies the cause event classification name as the cause event classification name related to the posted information. In this case, the influence range estimation unit 123 specifies the result event classification name related to the posted information by the method described above.

For example, in a case where the noun extracted from the posted text does not coincide with either the cause event classification name or the result event classification name, a cause event classification name and a result event classification name may be specified depending on whether there is a noun having a meaning close to the cause event classification name or the result event classification name among the extracted nouns.

When the cause event classification name related to the posted information is specified in this manner, the influence range estimation unit 123 extracts occurrence event information, in which the specified cause event classification name is registered as an occurrence event classification name, from the occurrence event table 111. In a case where one piece of corresponding occurrence event information is extracted, the influence range estimation unit 123 specifies an occurrence event name included in the occurrence event information as the occurrence event name related to the posted information. In a case where a plurality of pieces of corresponding occurrence event information are extracted, the influence range estimation unit 123 specifies, from the plurality of pieces of corresponding occurrence event information, occurrence event information in which a noun associated with the occurrence event name or the occurrence event classification name coincides with the noun extracted from the posted text, and specifies an occurrence event name included in the specified occurrence event information as the occurrence event name associated with the posted information.

In the example illustrated in FIG. 12, it is assumed that posted information 230 including a posted text 231, an image 232, metadata 233 of the image 232, and metadata 234 of the posted information 230 is acquired. At step S31, "flood" and "house" are extracted as nouns from the posted text 231, and since "flood" coincides with a result event classification name "flood" among these nouns, "flood" is specified as a result event classification name related to the posted information 230. Since a cause event classification name "typhoon" is associated with the result event classification name "flood" in the event classification table 112 (see FIG. 8), "typhoon" is specified as a cause event classification name related to the posted information 230. Occurrence event information in which "typhoon" is registered as an occurrence event classification name is extracted from the occurrence event table 111, and an occurrence event name "typhoon 1" included in the extracted occurrence event information is specified as an occurrence event name related to the posted information 230 (see FIG. 7).

For example, in a case where a plurality of pieces of occurrence event information in which "typhoon" is registered as the occurrence event classification name are registered in the occurrence event table 111, the influence range estimation unit 123 specifies any one of the pieces of occurrence event information based on a relationship between an occurrence time included in the occurrence event information and an imaging time included in the metadata 233. For example, occurrence event information in which the occurrence time is included in a period from the imaging time to a time before a certain time period is specified.

[STEP S32] The influence range estimation unit 123 collects influence range reference information corresponding to the result event classification name specified in step S31. Here, in the event classification table 112, an information source of the influence range reference information is specified based on link information of the influence range reference information, which is registered in association with a combination of the cause event classification name and the result event classification name specified in step S31. As the influence range reference information, for example, damage prediction information formally transmitted from a public institution is collected.

In the example of FIG. 12, "typhoon" and "flood" are specified as the cause event classification name and the result event classification name corresponding to the posted information 230, respectively. Therefore, a flood hazard map is collected as the influence range reference information based on the event classification table 112 (see FIG. 8).

[STEP S33] The influence range estimation unit 123 analyzes the posted text, and specifies whether a tense of the posted text is the present tense or the past tense.

[STEP S34] Based on the specified tense, the influence range estimation unit 123 determines a time and a position for estimating an influence range. In a case where the tense is the past tense, an influence range at an imaging position and an imaging time of the image is estimated. This is because, in a case where the tense is the past tense, it is considered that information at a time point before a posting time of the posted information (mainly, information at a time point at which the image is captured) is represented in the posted text. By contrast, in a case where the tense is the present tense, an influence range at a posting position and a posting time of the posted information is specified. This is because it is considered that information at the posting time of the posted information is represented in the posted text in a case where the tense is the present tense. In this manner, by determining the time and position for estimating the influence range in accordance with the tense of the posted text, it is possible to accurately estimate the influence range in next step S35.

In the example illustrated in FIG. 12, the tense of the posted text 231 is the present tense. Therefore, a posting time "15:00, Sep. 10, 2022" included in the metadata 234 of the posted information 230 is determined as a time at which an influence range is estimated. Although not illustrated, a posting position included in the metadata 234 is determined as a position at which the influence range is estimated.

The metadata 234 of the posted information 230 is not limited to being added to the posted information 230. In a case where the metadata 234 is not added to the posted information 230, the influence range estimation unit 123 acquires the metadata 234 from the SNS server 50 separately from the posted information 230.

[STEP S35] The influence range estimation unit 123 collects high-reliability information. Here, a measurement value of an influence factor at the position and the time specified in step S34 is collected as high-reliability information. The collected influence factor is an influence factor associated with the result event classification name specified in step S31 in the event classification table 112. A link destination serving as an information source of the influence factor is a high-reliability link destination such as a Web site of a public institution or a company that provides a service of providing weather information. Such a link destination may be determined in advance for the corresponding influence range reference information.

Based on the measurement value of the collected influence factor and the influence range reference information collected in step S32, the influence range estimation unit 123 estimates an influence range at the time specified in step S34.

As described above, in the example illustrated in FIG. 12, a flood hazard map is collected as the influence range reference information. For example, it is assumed that this flood hazard map indicates an assumed flooding area in a case where a cumulative precipitation amount for 24 hours is 200 mm, 300 mm, and 400 mm, respectively. In this case, in step S35, as the influence factor, a measurement value of the cumulative precipitation amount for the latest 24 hours up to the posting time at the posting position (actually, an observation point closest to the posting position) is collected. As illustrated in FIG. 12, it is assumed that the measurement value of the cumulative precipitation amount is 450 mm. In this case, the influence range estimation unit 123 specifies an assumed flooding area in a case where the cumulative precipitation amount is 400 mm from the flood hazard map, and estimates this area as the influence range.

For example, in a case where the measurement value of the cumulative precipitation amount is smaller than the minimum cumulative precipitation amount (200 mm in FIG. 12) at which it is assumed that flooding occurs in the flood hazard map, the influence range estimation unit 123 estimates that there is "no influence range" (for example, flood at the corresponding position by typhoon 1 does not occur).

Figure 13:
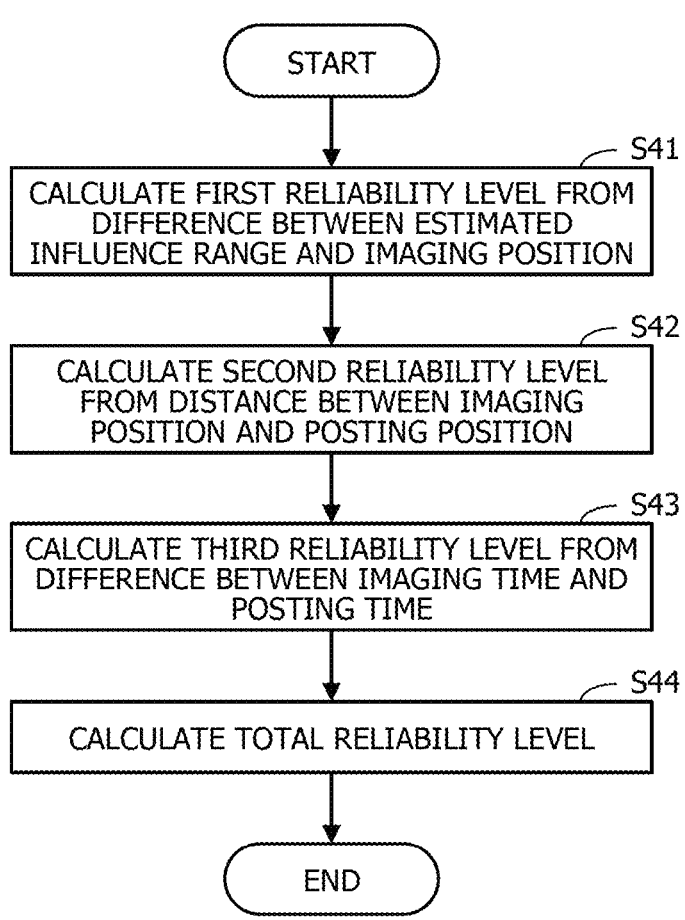
FIG. 13 is a flowchart illustrating an example of a reliability level calculation process.

FIG. 13 is a flowchart illustrating an example of a reliability level calculation process. In the following description, it is assumed that first to third reliability levels have values from 0 points to 100 points.

[STEP S41] Based on a difference between the influence range estimated in step S35 in FIG. 11 and the imaging position included in the metadata of the image, the reliability level calculation unit 124 calculates the first reliability level. Basically, the reliability level calculation unit 124 calculates the first reliability level to be higher as the difference between the influence range and the imaging position is smaller.

As an example, in a case where the imaging position is included in the influence range, the reliability level calculation unit 124 calculates the first reliability level as 100 points. In a case where the imaging position is out of the influence range, the reliability level calculation unit 124 calculates the first reliability level to be lower as a distance between the imaging position and a boundary of the influence range closest to the imaging position is longer.

As another example, the reliability level calculation unit 124 may calculate the first reliability level based on a difference between a river that is a water source of the flood and the imaging position. As the river, for example, a river that is in contact with or included in the influence range and has the largest distance to the imaging position is selected. For example, in a case where the imaging position is included in the influence range, the reliability level calculation unit 124 calculates the first reliability level to be higher as the distance between the imaging position and the river is shorter, in a range from 100 points to 70 points.

As an example, in a case where a straight line passing through the imaging position and is orthogonal to the river is drawn, a range from a position of the river on the straight line to the boundary of the influence range is equally divided into 30 parts. Every time the imaging position is moved by $\frac{1}{30}$ from the position of the river to the boundary side of the imaging position, the first reliability level is subtracted by 1 point from 100 points. For example, in a case where the imaging position is located at the boundary of the influence range and is farthest from the river over the straight line, the first reliability level is 70 point.

In a case where the imaging position is out of the influence range, the reliability level calculation unit 124 sets 70 points as the maximum and sets 0 points as the minimum, and decreases the first reliability level by one point as the imaging position and the river are distanced from each other by 0.1 km. In the case where it is estimated that there is no influence range since the precipitation amount is small, when the distance between the imaging position and the river is the same, the reliability level calculation unit 124 sets the first reliability level to a lower value in a case where there is no influence range than in a case where there is the influence range.

At step S41, for example, in a case where the tense of the posted text is the past tense at step S34 in FIG. 11, the imaging position may be used, and in a case where the tense of the posted text is the present tense at step S34, the posting position of the posted information may be used, instead of the imaging position. Accordingly, it is possible to improve calculation accuracy of the first reliability level itself.

[STEP S42] Based on the distance between the imaging position included in the metadata of the image and the posting position of the posted information, the reliability level calculation unit 124 calculates the second reliability level. Basically, the smaller the distance between the imaging position and the posting position, the higher the value of the second reliability level.

For example, when the distance between the imaging position and the posting position is within 5 km, the reliability level calculation unit 124 calculates the second reliability level to be higher as the distance is shorter, in a range from 100 points to 70 points. In a case where the distance between the imaging position and the posting position is equal to or more than 5 km, the second reliability level is decreased by one point as the distance is increased by 0.1 km, in a range from 70 points to 0 points. As an example, in a case where the distance between the imaging position and the posting position is 2 km, the second reliability level is calculated to be 88 points. Such a second reliability level is an index indicating a posting party of the posted information (or the posted text).

[STEP S43] Based on a difference between the imaging time included in the metadata of the image and the posting time of the posted information, the reliability level calculation unit 124 calculates the third reliability level. Basically, as the difference between the imaging time and the posting time is increased, the reliability level calculation unit 124 sets the third reliability level to be a lower value.

As a specific example, the reliability level calculation unit 124 sets a time at which the influence of the cause event on the imaging position starts to occur as a start time of the cause event. As illustrated in FIG. 12, in a case where the cause event is a typhoon, the start time of the cause event is, for example, a time when the imaging position is included in a storm region. The time when the imaging position is included in the storm region is acquired by high-reliability information, for example. Considering the start time of such a cause event, the reliability level calculation unit 124 calculates the third reliability level based on the difference between the imaging time and the posting time.

For example, in a case where the tense of the posted text is the past tense, when the difference between the posting time and the imaging time is within 6 hours, the reliability level calculation unit 124 calculates the third reliability level to be higher as the time difference is smaller, in a range from 50 points to 100 points. By contrast, in a case where the time difference exceeds 6 hours, the reliability level calculation unit 124 subtracts 10 points from the third reliability level as the time difference is increased by 1 hour, in a range from 50 points to 0 points.

In a case where the tense of the posted text is the present tense or the future tense, when the difference between the posting time and the imaging time is within 3 hours, the reliability level calculation unit 124 calculates the third reliability level to be higher as the time difference is smaller, in a range from 50 points to 100 points. By contrast, in a case where the time difference exceeds 3 hours, the reliability level calculation unit 124 subtracts 10 points from the third reliability level as the time difference is increased by 1 hour, in a range from 50 points to 0 points.

In a case where the imaging time is earlier than the start time of the cause event, the imaging time is inconsistent and there is a high possibility that a photograph unrelated to the cause event is used, so that the third reliability level has a low value. For example, in a case where the imaging time is earlier than the start time of the cause event, the reliability level calculation unit 124 sets the third reliability level to 0 points.

As an example, in the posted information 230 illustrated in FIG. 12, the imaging time is 14:30 on Sep. 10, 2022, and the posting time is 15:00 on Sep. 10, 2022. Assuming that the start time of the cause event is 9:00 on Sep. 10, 2022, since this start time is before the imaging time and the tense of the posted text 231 is the present tense, the calculation method in the case where the difference between the posting time and the imaging time is within 3 hours is applied. Since a difference between the imaging time of 14:30 and the posting time of 15:00 is 30 minutes (=0.5 hours), the third reliability level is calculated to be 92 points by an expression of $100-(50/3)\times0.5$.

[STEP S44] The reliability level calculation unit 124 calculates a total reliability level by integrating the calculated first to third reliability levels. For example, the total reliability level is calculated by calculating an average of the first to third reliability levels. As in the example described above, in a case where the first reliability level is 70 points, the second reliability level is 88 points, and the third reliability level is 92 points, the total reliability level is calculated as 83 points (half-adjust of the first decimal place).

Figure 14:
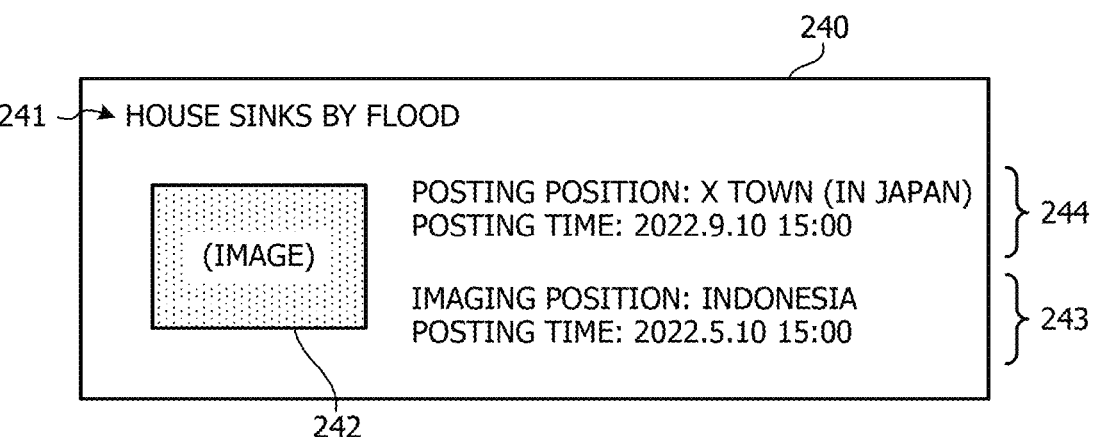
FIG. 14 is a diagram illustrating another example of the posted information.

FIG. 14 is a diagram illustrating another example of the posted information. Posted information 240 illustrated in FIG. 14 includes a posted text 241, an image 242, metadata 243 of the image 242, and metadata 244 of the posted information 240. A posting position and a posting time of the metadata 244 are assumed to be the same as the posting position and the posting time of the posted information 230 illustrated in FIG. 12.

In a case of this posted information 240, an influence range (assumed flooding area) in the same manner as the posted information 230 illustrated in FIG. 12 is specified as an influence range. Since an imaging position of the image 242 is Indonesia, the imaging position is not included in the influence range set in Japan, and the imaging position is separated from the influence range by a distance exceeding 4000 km, a first reliability level is calculated as 0 point.

Since the imaging position and the posting position are separated by a distance exceeding 4000 km, a second reliability level is also calculated as 0 points. In the same manner as the example described above, when a start time of a cause event is 9:00 on Sep. 10, 2022, an imaging time included in the metadata 243 is earlier than the start time of the cause event, and thus a third reliability level is also calculated to be 0 points.

Accordingly, a total reliability level is calculated as 0 points.

Figure 15:
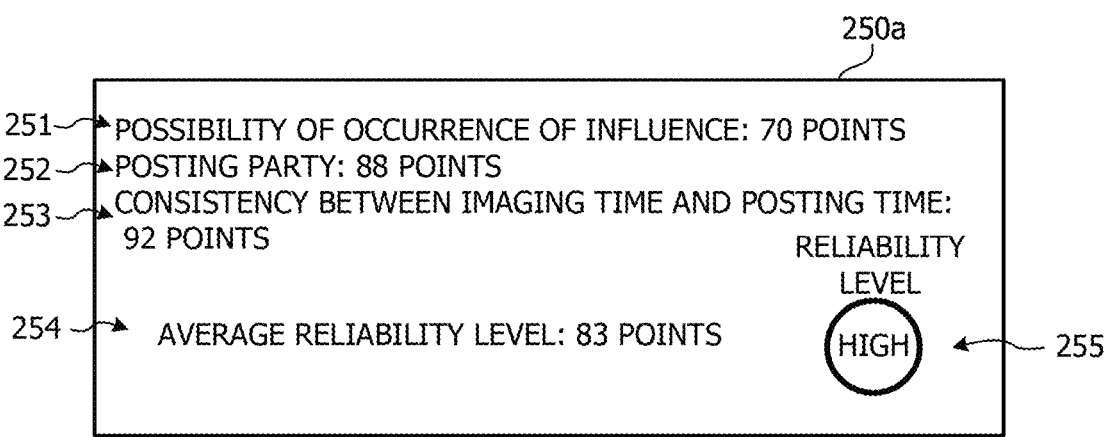
FIG. 15 is a first diagram illustrating an output processing example of a verification result.
Figure 16:
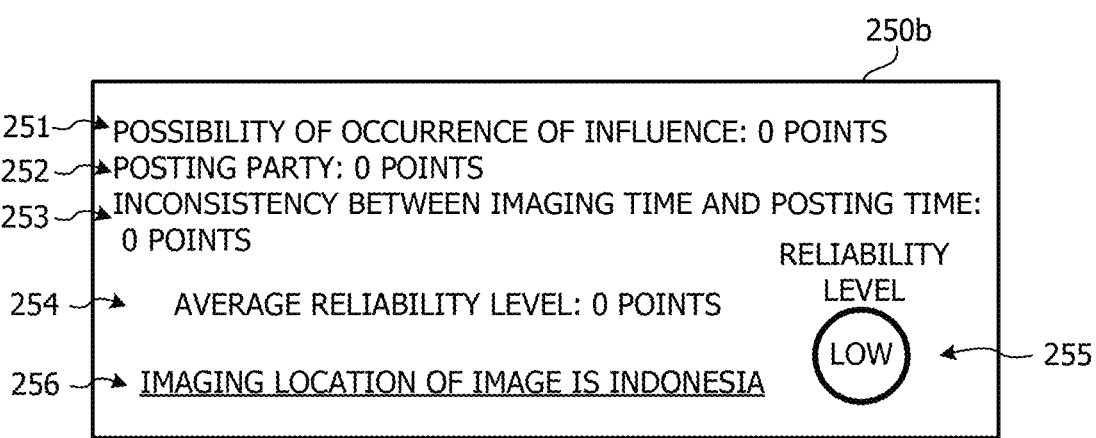
FIG. 16 is a second diagram illustrating the output processing example of the verification result.

FIG. 15 is a first diagram illustrating an output processing example of a verification result. A reliability display screen 250a illustrated in FIG. 15 is a display screen based on the posted information 230 illustrated in FIG. 12. FIG. 16 is a second diagram illustrating the output processing example of the verification result. A reliability display screen 250b illustrated in FIG. 16 is a display screen based on the posted information 240 illustrated in FIG. 14.

As a screen indicating a verification result, the verification result output unit 125 displays the reliability display screens 250a and 250b as illustrated in FIGS. 15 and 16 on a terminal device of a user. For example, when posted information as a verification target is displayed on a screen of an SNS site, it is desirable that the reliability display screens 250a and 250b are displayed as screens corresponding to the posted information. Accordingly, the user who intends to view the posted information may easily recognize a result of verifying a reliability of the posted information.

The reliability display screens 250a and 250b include a display unit 251 for a first reliability level, a display unit 252 for a second reliability level, a display unit 253 for a third reliability level, a display unit 254 for a total reliability level, and a display unit 255 for a reliability level label. Since not only the total reliability level but also calculated values of the first to third reliability levels are displayed in the reliability display screens 250*a* and 250*b*, a basis of the reliability level calculation may be presented to the user.

For example, the reliability level label displayed on the display unit 255 is a label in which the total reliability level is divided into three ranges, and "high" is displayed in a case where the total reliability level is 70 points or more, "intermediate" is displayed in a case where the total reliability level is 50 points or more and less than 70 points, and "low" is displayed in a case where the total reliability level is less than 50 points. By displaying such a reliability level label, it is possible to present the reliability level to the user in an easily understandable manner.

The total reliability level is "low" in the reliability display screen 250*b* in FIG. 16. As described above, in a case where the total reliability level is "low", the display unit 256 indicating a reason why the total reliability level is low may be displayed.

With the second embodiment described above, since the first reliability level is calculated in consideration of the influence range of the event related to the posted information, the reliability level of the posted information may be calculated with high accuracy even in a case where the influence of the event such as a disaster extends over a wide range. Since the final reliability level is calculated in consideration of not only the first reliability level but also the second reliability level indicating the posting party of the posted information and the third reliability level indicating the consistency between the imaging time and the posting time, it is possible to increase the calculation accuracy of the reliability level.

The processing functions of the apparatuses (for example, the information processing apparatus 1, the SNS server 50, the verification server 100, and the information source servers 60*a*, 60*b*, and . . . ) described in each embodiment described above may be implemented by a computer. In such a case, a program describing the processing contents of the functions to be included in each apparatus is provided, and the processing functions described above are implemented over the computer by executing the program with the computer. The program describing the processing contents may be recorded in a computer-readable recording medium. Examples of the computer-readable recording medium include a magnetic storage device, an optical disc, a semiconductor memory, and the like. Examples of the magnetic storage device include a hard disk drive (HDD), a magnetic tape, and the like. Examples of the optical disc include a compact disc (CD), a Digital Versatile Disc (DVD), a Blu-ray disc (BD, registered trademark), and the like.

In a case where the program is distributed, for example, a portable-type recording medium such as a DVD or a CD on which the program is recorded is sold. The program may be stored in a storage device of a server computer and transferred from the server computer to another computer via a network.

The computer that executes the program stores, in a storage device thereof, the program recorded on the portable-type recording medium or the program transferred from the server computer, for example. The computer reads the program from the storage device thereof and executes the processing according to the program. The computer may also read the program directly from the portable-type recording medium and execute the processing according to the program. Each time the program is transferred from the server computer coupled to the computer via the network, the computer may also sequentially execute the processing according to the received program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information verification program for causing a computer to execute a process comprising:

acquiring posted information that includes first information which is text information, second information which is at least one of image information and audio information, and metadata of the second information, the metadata including a creation position at which the second information is created and a creation time at which the second information is created;

specifying an event that occurs, by extracting a word from the first information and collating the word with predetermined words indicating a plurality of events;

determining a tense of the first information;

specifying an occurrence range as an influence range that indicates a range of at least one of a geographical influence and a temporal influence by the event based on influence information including geographic mesh data where each mesh is associated with a risk value and corresponding to the event acquired from an information source other than the posted information, wherein, in a case where the tense of the first information is a past tense, the occurrence range at the creation time is specified, and in a case where the tense of the first information is a present tense, the occurrence range at a posting time at which the posted information is posted is specified;

identifying meshes from the geographic mesh data whose risk value exceeds a threshold determined based on the acquired physical parameter value, wherein a set of the identified meshes constitutes the occurrence range;

calculating a shortest distance between the occurrence range and the creation position; and calculating a first reliability level of the posted information such that the first reliability becomes higher as the shortest distance becomes shorter.

2. The non-transitory computer-readable recording medium according to claim 1, the process further comprising:

calculating a second reliability level of the posted information based on a distance between the creation position and a posting position at which the posted information is posted; and calculating a total reliability level of the posted information based on the first reliability level and the second reliability level.

3. The non-transitory computer-readable recording medium according to claim 2, wherein the metadata includes a creation time at which the second information is created, the process further comprising:

calculating a third reliability level of the posted information based on a difference between the creation time and a posting time at which the posted information is posted, and the total reliability level is calculated based on the first reliability level, the second reliability level, and the third reliability level.

4. An information processing apparatus comprising:

a memory; and a processor coupled to the memory and configured to:

acquire posted information that includes first information which is text information, second information which is at least one of image information and audio information, and metadata of the second information, the metadata including a creation position at which the second information is created and a creation time at which the second information is created;

specify an event that occurs by extracting a word from the first information and collating the word with predetermined words indicating a plurality of events;

determining a tense of the first information;

specify an occurrence range as an influence range that indicates a range of at least one of a geographical influence and a temporal influence by the event based on influence information including geographic mesh data where each mesh is associated with a risk value and corresponding to the event acquired from an information source other than the posted information, wherein, in a case where the tense of the first information is a past tense, the occurrence range at the creation time is specified, and in a case where the tense of the first information is a present tense, the occurrence range at a posting time at which the posted information is posted is specified;

identifying meshes from the geographic mesh data whose risk value exceeds a threshold determined based on the acquired physical parameter value, wherein a set of the identified meshes constitutes the occurrence range;

calculate a shortest distance between the occurrence range and the creation position; and calculate a first reliability level of the posted information such that the first reliability becomes higher as the shortest distance becomes shorter.

5. An information processing system comprising:

a first information processing apparatus configured to include a first memory and a first processor that is coupled with the first memory and receives posting of posted information that includes first information which is text information and second information which is at least one of image information and audio information, and displays the first information and the second information on a posting screen, the metadata including a creation position at which the second information is created and a creation time at which the second information is created; and a second information processing apparatus configured to include a second memory and a second processor that is coupled with the second memory and acquires the posted information from the first information processing apparatus, specifies an event that occurs by extracting a word from the first information and collating the word with predetermined words indicating a plurality of events, determines a tense of the first information, specifies an occurrence range as an influence range that indicates a range of at least one of a geographical influence and a temporal influence by the event based on influence information including geographic mesh data where each mesh is associated with a risk value and corresponding to the event acquired from an information source other than the posted information, identifies meshes from the geographic mesh data whose risk value exceeds a threshold determined based on the acquired physical parameter value, wherein a set of the identified meshes constitutes the occurrence range, calculates a shortest distance between the occurrence range and the creation position, and calculates a first reliability level of the posted information such that the first reliability becomes higher as the shortest distance becomes shorter.

* * * * *